(12) United States Patent
Hardy

(10) Patent No.: US 7,368,660 B2
(45) Date of Patent: May 6, 2008

(54) ANTI-CASCADING SUSPENSION CLAMPS FOR OVERHEAD POWER TRANSMISSION LINES

(76) Inventor: Claude Hardy, 95 rue Lamarche, St. Bruno, Québec (CA) J3V 5A5

(*) Notice: Subject to any disclaimer, the term of this patent is extended or adjusted under 35 U.S.C. 154(b) by 0 days.

(21) Appl. No.: 11/563,051

(22) Filed: Nov. 24, 2006

(65) Prior Publication Data

US 2007/0084627 A1   Apr. 19, 2007

Related U.S. Application Data

(63) Continuation of application No. PCT/CA2004/000778, filed on May 26, 2004.

(51) Int. Cl.
*H02G 7/00* (2006.01)

(52) U.S. Cl. .............. 174/40 R; 174/40 TD; 174/41; 174/45 R

(58) Field of Classification Search .......... 174/40 R, 174/40 CC, 41, 42, 43, 45 R, 45 TD
See application file for complete search history.

(56) References Cited

U.S. PATENT DOCUMENTS

| | | | |
|---|---|---|---|
| 1,871,336 A * | 8/1932 | Miller et al. ............. | 248/64 |
| 2,931,606 A | 4/1960 | Fraser et al. | |
| 3,150,229 A | 9/1964 | Milow | |
| 3,519,727 A | 7/1970 | Rasmussen et al. | |
| 3,566,011 A * | 2/1971 | Pinkham et al. ........... | 174/169 |
| 3,711,049 A | 1/1973 | Grannis | |
| 3,761,865 A | 9/1973 | Bomgaars et al. | |
| 4,177,352 A * | 12/1979 | Dunbar et al. ............ | 174/1 |
| 4,195,192 A | 3/1980 | Hackney et al. | |
| 4,461,521 A | 7/1984 | Sachs | |
| 4,523,054 A * | 6/1985 | Baker et al. ............. | 174/45 R |
| 4,814,550 A | 3/1989 | Newberg | |
| 6,201,184 B1 | 3/2001 | François et al. | |
| 2003/0183733 A1 | 10/2003 | Pisczak | |

FOREIGN PATENT DOCUMENTS

JP   405292636 A   11/1993

\* cited by examiner

*Primary Examiner*—William H. Mayo, III
(74) *Attorney, Agent, or Firm*—Ogilvy Renault LLP

(57) ABSTRACT

A suspension clamp (10) has a stirrup part (12) with an upper end adapted for pivotal connection to a string of insulators (S) of a transmission tower. A clamping part (14) is accommodated within the stirrup part (12) for clamping onto the overhead conductor (L) supported by the towers. A releasable connection (34) is provided between the stirrup part (12) and the clamping part (14) for releasing the clamping part (14) from the stirrup part (12) whenever a predetermined excessive longitudinal force is exerted by the overhead conductor (L). The stirrup part (12) holds the line together with the clamping part (14) suspended once the clamping part (14) has been released from the stirrup part (12).

17 Claims, 4 Drawing Sheets

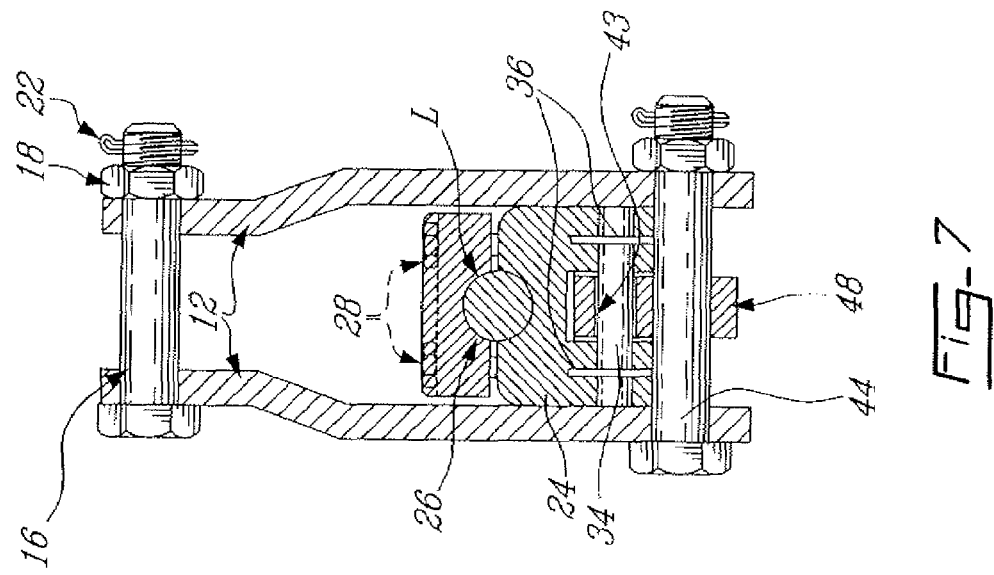
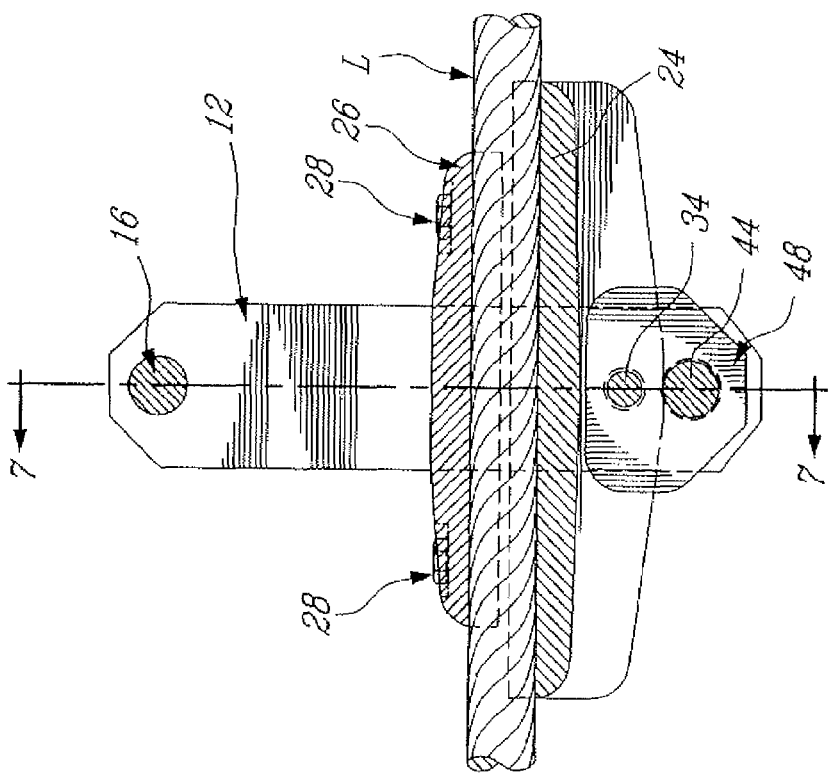

ically described the nature of the invention, reference will now be made to the accompanying
ANTI-CASCADING SUSPENSION CLAMPS FOR OVERHEAD POWER TRANSMISSION LINES

RELATED APPLICATION(S)

This application is a continuation of PCT Parent Application No. PCT/CA2004/000778 filed on May 26, 2004, which is herein incorporaed by reference.

BACKGROUND OF THE INVENTION

1. Field of the Invention

The present invention generally relates to suspension clamps for suspending overhead conductors from the insulators of transmission towers and poles.

2. Description of the Prior Art

Over the years, various devices have been developed for suspending overhead conductors lines from transmission towers and preventing the transmission of excessive longitudinal loads from the conductors to the towers. For instance, U.S. Pat. No. 2,931,606 issued to Fraser et al. on Apr. 5, 1960, discloses a suspension clamp adapted to drop the conductor to the ground under certain conditions which exceed the safe load that can be imposed upon the towers. Obviously, this solution is not acceptable in populated districts, as it represent severe risks of injuries to the population.

There is thus a need for a new releasable suspension clamp which is adapted to prevent the transmission of excessive longitudinal loads from the conductors to the towers while holding the conductor suspended at all time even under abnormal loading conditions.

SUMMARY OF THE INVENTION

It is therefore an aim of the present invention to provide a suspension clamp for overhead power lines which will automatically release the conductors while preventing them from falling to the ground, when subject to abnormal longitudinal loads which would cause damages to the suspension towers.

It is also an aim of the present invention to provide such a suspension clamp which is of simple and reliable construction.

It is still a further aim of the present invention to provide such a suspension clamp which offers ease of installation.

Therefore, in accordance with the present invention, there is provided an anti-cascading suspension clamp for suspending an overhead conductor from a string of insulators of a transmission tower, the anti-cascading suspension clamp comprising a first part adapted for pivotal connection to the insulator, a second part adapted to clamp onto the overhead power transmission line, a releasable connection between said first part and said second part for releasing said second part from said first part whenever a predetermined excessive longitudinal force is exerted by the overhead conductor, thereby preventing damage to the tower and the insulators, and a conductor catching portion provided at a lower end of said first part for preventing the overhead conductor together with the second part of the suspension clamp from falling to the ground after said second part has been released from said first part.

In accordance with a further general aspect of the present invention, there is provided an anti-cascading suspension clamp for suspending an overhead conductor from a string of insulators of a transmission tower, the anti-cascading suspension clamp comprising a stirrup part having an upper end adapted for pivotal connection to the insulators and a closed lower end through which the overhead conductor extends, a clamping part received between opposed sides of said stirrup part and above said closed lower end thereof, said clamping part being adapted to clamp onto the overhead conductor, and a calibrated releasable connection between said stirrup part and said clamping part for longitudinally releasing said clamping part from said stirrup part whenever a predetermined excessive longitudinal force is exerted by the overhead conductor, thereby preventing damage to the tower and the insulators, said closed lower end of said stirrup part holding the conductor together with the clamping part suspended once the clamping part has been released from the stirrup part.

The term "tower" is herein intended to cover any upstanding structures, such as lattice towers, portal structures, poles or the like, used to support overhead conductors.

BRIEF DESCRIPTION OF THE DRAWINGS

Having thus generally described the nature of the invention, reference will now be made to the accompanying drawings, showing by way of illustration a preferred embodiment thereof, and in which:

FIG. 6 is a cross-sectional side view of a suspension clamp in accordance with a further general embodiment of the present invention; and FIG. 7 is a cross-sectional end view of the suspension clamp shown in FIG. 6.

DESCRIPTION OF THE PREFERRED EMBODIMENTS

As will be seen hereinafter, the present invention is generally directed to suspension clamps connected to the insulators of transmission towers in order to suspend overhead conductors from the towers. More particularly, the present invention relates to the integration of a safety device to such suspension clamps in order to prevent the towers and associated insulators from being damaged whenever the longitudinal loads in the overhead conductors exceed a predetermined critical value. According to a general aspect of the present invention, the safety device is operational to longitudinally release the conductors from the towers while holding the conductors suspended to prevent them from falling to the ground.

Figure 1:
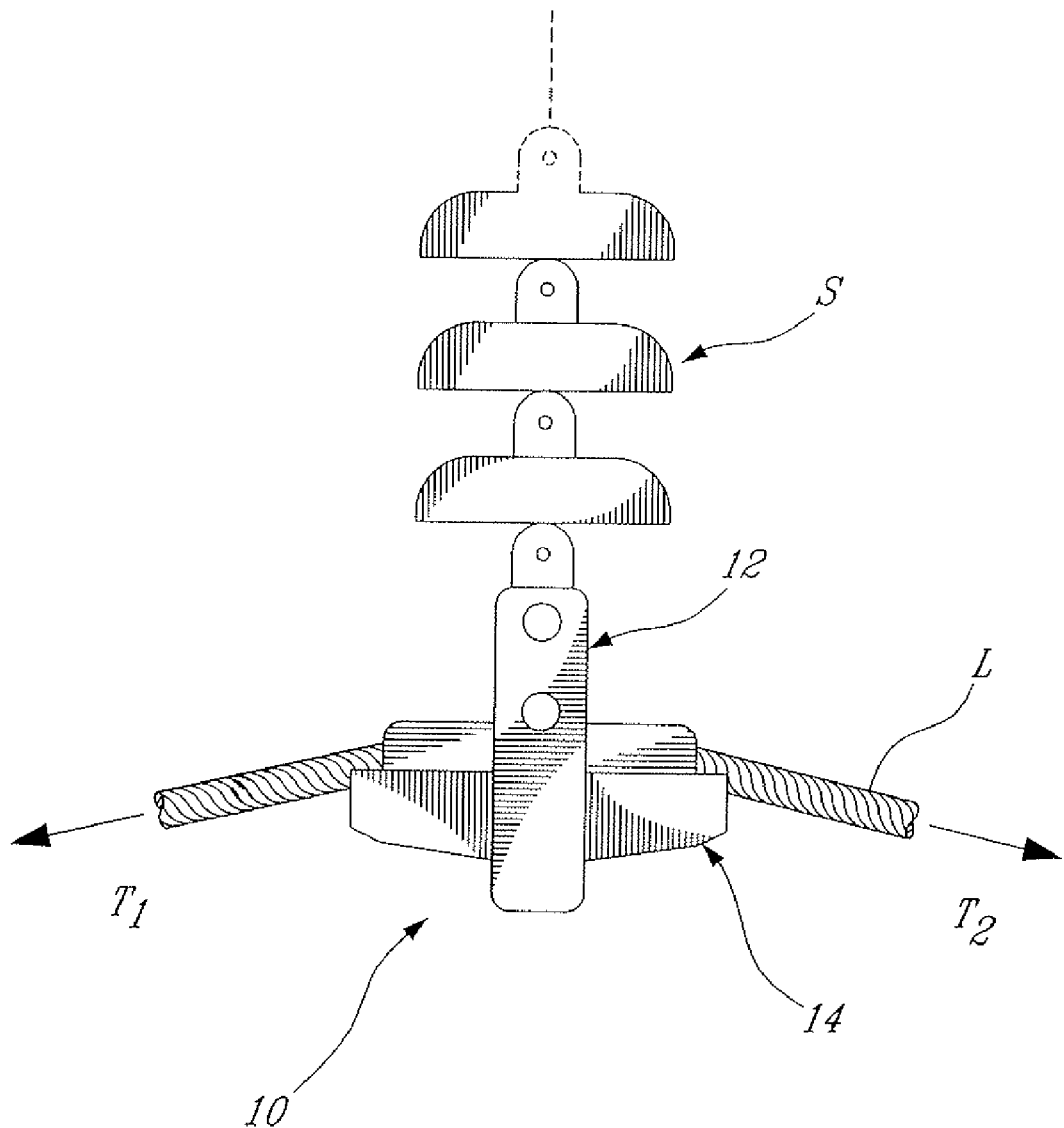
FIG. 1 is a schematic side elevation view of a suspension clamp pivotally connected to a string of insulators for supporting an overhead conductor in accordance with an embodiment of the present invention.

Now referring to the drawings and, in particular to FIG. 1, there is shown a suspension clamp 10 having a first part, for instance a stirrup 12, pivotally connected to the lower end of a string of insulators S depending from an overhead transmission tower (not shown). The suspension clamp 10 has a second part, for instance a clamping assembly 14, connected to the stirrup 12 for clamping onto a conductor L of an overhead transmission line. Under normal conditions, the tensions $T_1$ and $T_2$ in the conductor on opposed side of the suspension clamp 10 are balanced and the stirrup 12 remains vertical, as shown in FIG. 1.

Figure 2:
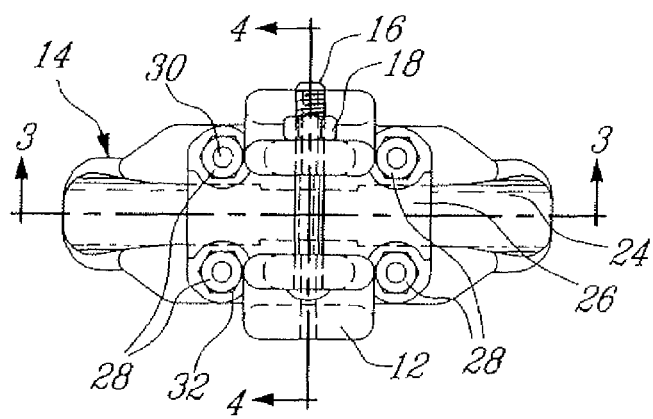
FIG. 2 is a top plan view of the suspension clamp.
Figure 3:
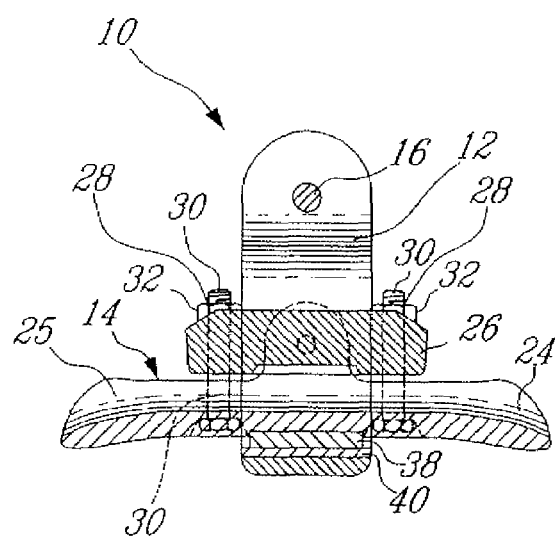
FIG. 3 is a cross-sectional view of the suspension clamp taken along line 3-3 in FIG. 2.
Figure 4:
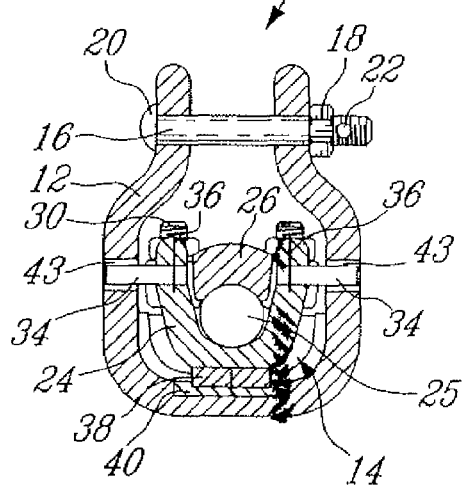
FIG. 4 is a cross-sectional end view of the suspension clamp shown in FIG. 2.

According to the illustrated embodiment shown in FIGS. 2 to 4, the stirrup 12 is a one piece body having a substantially U-shaped configuration. An axle 16 extends transversally through the upper end of the opposed sides of the stirrup 12 for pivotal connection with the lower end of the string of insulators S. The axle 16 is held in position by means of a nut 18 threadably engaged with a threaded end of the axle 16 opposite a head thereof 20. A security clip 22 is preferably provided to prevent accidental disengagement of the nut 18 from the threaded end of the axle 16.

The clamping assembly 14 generally comprises a clamp body 24 defining an open ended longitudinal through 25 for receiving the conductor, a cover or keeper 26, and a nut and bolt tightening set 28 for securely clamping the conductor L of the overhead transmission line between the keeper 26 and the clamp body 24. According to the illustrated embodiment, the nut and bolt tightening set 28 includes a clamping bolt 30, a nut 32 and a lock washer (not shown) at each corner of the clamp body 24 and keeper 26 (see FIG. 2). Vertical holes (not shown) are defined in the corners of the clamp body 24 and the keeper 26 for receiving the clamping bolts 30, thereby allowing the keeper 26 to be tightened to the clamp body 24 for securely clamping the conductor L in the open ended longitudinal through 25 between the keeper 26 and the clamp body 24.

As shown in FIG. 4, the clamping assembly 14 is nested within the stirrup 12 and connected thereto by means of a pair of axially aligned shear pins 34. The shear pins 34 extend transversally through opposed sides of the stirrup 12 and into the opposed sides of the clamp body 24 above the conductor L of the transmission line, i.e. above the axes of the longitudinal through 25. The shear pins 34 are set to break when an unbalanced longitudinal load in the conductor on one side of the suspension clamp 10 reaches a value which is likely to result in damages to the transmission towers and the associated insulators S. Other frangible or releasable connections between the clamping part 14 and the stirrup 12 which also provide for the release of the clamping part 14 from the stirrup 12 upon excessive unbalance longitudinal loads in the conductors are contemplated as well.

Security pins 36 are provided for preventing unintentional disengagement of the shear pins 34 from the clamp body 24. The clamp body 24 is provided on an undersurface thereof with a bronze sliding block 38 slidably received in a bronze sliding guide 40 securely mounted to an inner surface of the closed lower end of the stirrup 12. As an alternative, other friction reducing members such as a flat needle or roller bearing may be substituted to the bronze sliding block and guide.

Accordingly, the vertical loads exerted onto the conductor, including its weight, are transmitted from the clamping assembly 14 to the stirrup 12 via the sliding block 38 and the sliding guide 40 and then from the stirrup 12 to the transmission tower through the string of insulators S. In contrast, the unbalanced longitudinal loads in the conductor are directly transmitted to the shear pins 34 and then successively to the stirrup 12, the string of insulators S and the tower. The present invention thus provides for an independent bearing of the vertical and longitudinal loads imparted to the conductor of the overhead transmission line.

In operation, when an unbalanced longitudinal load reaches a predetermined value, as for instance in the event of a conductor breaking on one side of the suspension clamp 10, the shear pins 34 will break and the clamping assembly 14 will be pulled out of the stirrup 12, thereby relieving the tension in the conductor and, thus, preventing the transmission of excessive load to the tower the string of insulators S. After the release of the clamping assembly 14 from the stirrup 12, the conductor together with the clamping assembly 14 secured thereon will be held in suspension by the stirrup 12. The closed bottom end of the stirrup 12 forms a conductor catching portion for preventing the conductor from falling to the ground. Therefore by passing the overhead conductor through the stirrup 12, it is possible to obtain a longitudinal load relieving mechanism which will prevent the transmission of excessive longitudinal loads to the towers while at the same time holding the conductor suspended at all time.

Figure 5:
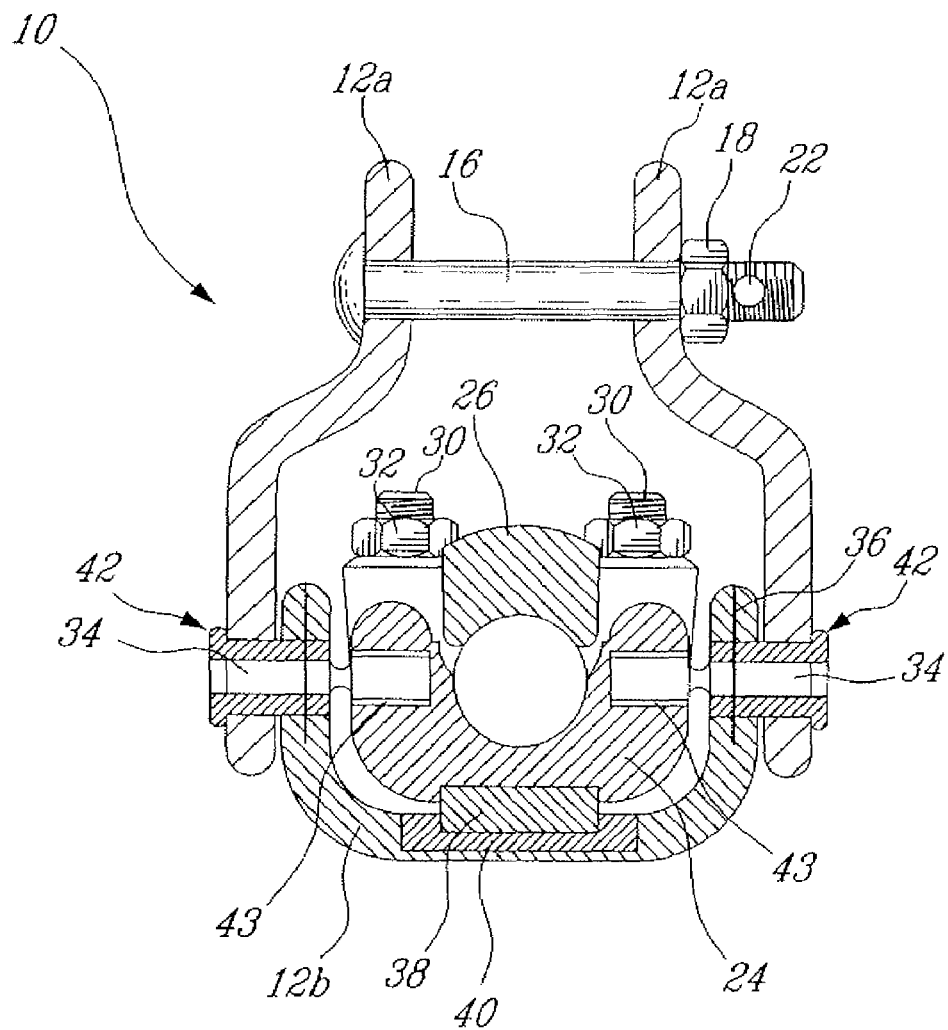
FIG. 5 is a cross-sectional end view of a suspension clamp in accordance with another embodiment of the present invention.

FIG. 5 shows a second embodiment of the present invention. For simplicity and brevity, like components are given the same reference numerals, and a duplicate description of these components is omitted. The second embodiment essentially differs from the first embodiment in that the stirrup 12 is divided in two parts 12a and 12b articulated to one another by means of a pair of hollow swivel pins 42, the axis of which intersects at right angles the central axis of the conductor. Each hollow swivel pin 42 receives the outer end of a shear pin 34. The inner end of each shear pin 34 is received in a mortise 43 defined in the clamp body 24 of the suspension clamp 10.

FIGS. 6 and 7 show a further embodiment of the present invention. Again, like components are given the same reference numerals and a duplicate description of these components is omitted. According to this embodiment, the suspension clamp 10 is also pivoted underneath the conductor L. The bottom end of the stirrup 12 is closed by a bottom axle 44 which extends transversally through the opposed sides of the stirrup 12. The clamping body 24 defines a longitudinal slot in which is received a link 48. As shown in FIG. 7, the axle 44 extends transversally through the link 48 to connect it to the stirrup 12. The link 48 is connected at the opposed upper end thereof to the clamping body 24 via a single shear pin 34. The vertical loads imparted onto the conductor L are supported by the bottom axle 44 and transmitted to the insulator string S via the stirrup 12. In contrast, the longitudinal loads are directly transmitted from the conductor L to the shear pin 34 which is set to break whenever an excessive longitudinal load is reached.

The embodiments of the invention described above are intended to be exemplary. Those skilled in the art will therefore appreciate that the foregoing description is illustrative only, and that various alternatives and modifications can he devised without departing from the spirit of the present invention. Accordingly, the present is intended to embrace all such alternatives, modifications and variances which fall within the scope of the appended claims. For instance, the opposed sides of the stirrup 12 could be connected to each other by a string or other linking elements to catch the conductor and thus prevent it from falling to the ground whenever the releasing mechanism has been actuated.

What is claimed is:

1. An anti-cascading suspension clamp arrangement comprising a vertical string of suspension insulators depending downwardly from an overhead transmission tower, and an anti-cascading suspension clamp having a first part pivotally connected to a lower end of the vertical string of suspension insulators, a second part adapted to clamp onto an overhead conductor to be suspended from the string of insulators, a releasable connection between said first part and said second part for releasing said second part from said first part whenever a predetermined excessive longitudinal force is exerted by the overhead conductor, thereby preventing damage to the tower and the insulator, and a conductor catching portion provided at a lower end of said first part for preventing the overhead conductor together with the second part of the suspension clamp from falling to the ground after said second part has been released from said first part.

2. A suspension clamp arrangement as defined in claim 1, wherein said conductor catching portion extends underneath said second part.

3. A suspension clamp arrangement as defined in claim 1, wherein said conductor catching portion is formed by a closed bottom end of said first part.

4. A suspension clamp arrangement as defined in claim 1, wherein said first part is provided in the form of a stirrup, and wherein said second part is accommodated within said stirrup.

5. A suspension clamp arrangement as defined in claim 4, wherein said second part includes a clamping assembly mounted within said stirrup between opposed sides thereof and above a closed bottom portion thereof.

6. A suspension clamp arrangement as defined in claim 1, wherein said second part is received within said first part, and wherein said releasable connection includes at least one frangible member extending transversally of said first and second parts.

7. A suspension clamp arrangement as defined in claim 6, wherein said at least one frangible member includes a pair of shear pins extending laterally outwardly from opposed sides of said second part.

8. A suspension clamp arrangement as defined in claim 7, wherein said shear pins have respective outer ends received in hollow swivel pins, and wherein said first part has an upper portion articulated to a closed lower portion by means of said swivel pins.

9. A suspension clamp arrangement as defined in claim 1, wherein said releasable connection includes a link connected at a first end thereof to said second part via a transversally extending shear pin and at a second end thereof to said first part via a transversally extending axle.

10. An anti-cascading suspension clamp arrangement defined in claim 1, wherein a longitudinal guide is provided between the first and second part.

11. An anti-cascading suspension clamp for suspending an overhead conductor from a vertically downwardly depending string of insulators of a transmission tower, the anti-cascading suspension clamp comprising a stirrup part having an upper end portion provided with a pivot adapted for pivotal connection to a lower end of the string of insulators and a closed lower end portion, the pivot having a first axis perpendicular to the overhead conductor when the clamp is mounted to the string of insulators, the lower end portion being pivotally connected to the upper end portion for pivotal movement about a second axis parallel to said first axis and intersecting the overhead conductor, a clamping part received between opposed sides of said stirrup part and above said closed lower end portion thereof, said clamping part being adapted to clamp onto the overhead conductor, and a calibrated releasable connection between said stirrup part and said clamping part for longitudinally releasing said clamping part from said stirrup part whenever a predetermined excessive longitudinal force is exerted by the overhead conductor, thereby preventing damage to the tower and the insulators, said closed lower end portion of said stirrup part holding the conductor together with the clamping part suspended once the clamping part has been released from the stirrup part, and wherein said clamping part is provided on an undersurface thereof with a friction reducing member running on an inner surface of said closed lower end portion of the stirrup part.

12. An anti-cascading suspension clamp as defined in claim 11, wherein said releasable connection includes at least one frangible member extending transversally of said stirrup and clamping parts.

13. An anti-cascading suspension clamp as defined in claim 12, wherein said at least one frangible member includes a pair of shear pins extending laterally outwardly from opposed sides of said clamping part.

14. An anti-cascading suspension clamp as defined in claim 13, wherein said shear pins have respective outer ends received in hollow swivel pins.

15. An anti-cascading suspension clamp as defined in claim 11, wherein said releasable connection includes a link connected at a first end thereof to said clamping part via a transversally extending shear pin and at a second end thereof to said stirrup part via a transversally extending axle.

16. An anti-cascading suspension clamp as defined in claim 11, wherein said friction reducing member comprises a sliding block integrated in the undersurface of the clamping part.

17. An anti-cascading suspension clamp as defined in claim 16, wherein the sliding block is engaged in a guide provided at the inner surface of the closed lower end portion of the stirrup part.

* * * * *